US006619545B2

(12) United States Patent
Harris

(10) Patent No.: US 6,619,545 B2
(45) Date of Patent: Sep. 16, 2003

(54) KIOSK HAVING A PEOPLE PRESENCE DETECTOR TO DETERMINE IF A KIOSK ITEM IS TO BE PRESENTED TO A CUSTOMER

(75) Inventor: Richard Hunter Harris, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/047,000

(22) Filed: Jan. 15, 2002

(65) Prior Publication Data

US 2003/0132287 A1 Jul. 17, 2003

(51) Int. Cl.[7] .......... G06K 7/08
(52) U.S. Cl. .......... 235/381
(58) Field of Search .......... 235/379, 381, 235/481, 486; 194/216, 217; 705/43, 14; 902/4, 8, 14; 364/401, 405

(56) References Cited

U.S. PATENT DOCUMENTS

| | | | | | |
|---|---|---|---|---|---|
| 5,220,599 | A | | 6/1993 | Sasano et al. | 379/142 |
| 5,247,648 | A | | 9/1993 | Watkins et al. | 395/425 |
| 5,299,260 | A | | 3/1994 | Shaio | 379/265 |
| 5,305,197 | A | * | 4/1994 | Axler et al. | 705/14 |
| 5,446,515 | A | * | 8/1995 | Wolfe et al. | 396/2 |
| 5,499,707 | A | * | 3/1996 | Steury | 194/217 |
| 5,504,675 | A | * | 4/1996 | Cragun et al. | 705/14 |
| 5,515,426 | A | | 5/1996 | Yacenda et al. | 379/201 |
| 5,542,066 | A | | 7/1996 | Mattson et al. | 395/463 |
| 5,553,307 | A | | 9/1996 | Fujii et al. | 395/845 |
| 5,652,789 | A | | 7/1997 | Miner et al. | 379/201 |
| 5,703,943 | A | | 12/1997 | Otto | 379/265 |
| 5,822,418 | A | | 10/1998 | Yacenda et al. | 379/201 |
| 5,904,869 | A | * | 5/1999 | Saito et al. | 219/121.68 |
| 5,958,078 | A | | 9/1999 | Yamamoto et al. | 714/766 |
| 6,151,464 | A | * | 11/2000 | Nakamura et al. | 399/79 |
| RE37,001 | E | | 12/2000 | Morganstein et al. | 379/67 |
| 6,186,396 | B1 | * | 2/2001 | Crandall, Jr. | 235/379 |
| 6,201,950 | B1 | | 3/2001 | Fuller et al. | 455/31.2 |
| 6,256,046 | B1 | * | 7/2001 | Waters et al. | 345/473 |
| 6,308,887 | B1 | * | 10/2001 | Korman et al. | 235/379 |
| 6,315,194 | B1 | * | 11/2001 | Graef et al. | 235/379 |
| 6,405,203 | B1 | * | 6/2002 | Collart | 707/10 |
| 6,443,359 | B1 | * | 9/2002 | Green et al. | 235/379 |
| 6,523,743 | B1 | * | 2/2003 | Patterson et al. | 235/379 |

* cited by examiner

*Primary Examiner*—Karl D. Frech
*Assistant Examiner*—Edwyn Labaze
(74) *Attorney, Agent, or Firm*—J. Bruce Schelkopf

(57) ABSTRACT

A method and system for a kiosk to present a kiosk item, e.g., document, money, merchandise, credit card, to a customer. A determination may be made as to whether the customer is currently present via an infrared device configured to detect the presence of a customer. If the customer is not present, then the kiosk item, e.g., document, money, merchandise, credit card, may not be presented to the customer. By not presenting the kiosk item, security/privacy may be improved since the next customer would not be able to obtain the kiosk item that was never presented to an unavailable customer.

47 Claims, 5 Drawing Sheets

KIOSK HAVING A PEOPLE PRESENCE DETECTOR TO DETERMINE IF A KIOSK ITEM IS TO BE PRESENTED TO A CUSTOMER

TECHNICAL FIELD

The present invention relates to the field of kiosks, and more particularly to a kiosk comprising a people presence detector that determines whether or not a document, e.g., receipt, ticket, or other kiosk items, e.g., money, credit card, merchandise, are presented to a customer.

BACKGROUND INFORMATION

A kiosk, e.g., Automated Teller Machines (ATMs), gasoline pumps, parking meters, may refer to a machine placed in a location for general, e.g., public, access by customers so that a service provider may provide a service to these customers. A kiosk may be stand alone, e.g., information kiosk in shopping malls, or may be connected by a network, e.g., bank ATMs, airline ticket machines. The services provided by a kiosk may be "self services"; in that, the services may be conducted by the customer without an agent or assistant offering specific help to the customer. Consequently, the services may tend to be repetitive, simple and specific tasks such as getting information and/or completing certain simple transactions, e.g., buying tickets, getting cash, purchasing gasoline, seeing the department store's floor map, etc.

Generally these transactions may involve the use of some device(s), e.g., one or more monitors, a card reader, a ticket printer, a laser printer, a cash dispenser, etc. Typically, a kiosk at the end of a transaction may print information detailing the transaction on a document, e.g., a receipt, ticket, and then present it to a customer who keeps it as verification of the service rendered. A customer though may walk away from the kiosk before the printing of the document was complete thereby leaving the document for the next customer. If the document contains private/confidential information, e.g., credit card number, the next customer may be able to obtain such information. Furthermore, the next customer of the kiosk or the kiosk itself may discard the document on the floor surrounding the kiosk thereby littering the area surrounding the kiosk.

Some kiosks have been designed with a printer configured to pull an abandoned document back into the kiosk if it is not removed within a certain time period. The retracted document may then be fed into a receptacle located inside the kiosk to eliminate litter surrounding the area around the kiosk. However, the kiosk may be exposed to paper jams and unreliable operation because the document may become damaged while outside the kiosk. Furthermore, since the determination of retracting a document is based upon an elapsed time period, a customer may be unable to retrieve the document because the customer did not take the document quickly enough. If the presentment of the document were based upon the presence of the customer, then the document may only be presented to the customer if the customer were available to take the document. Consequently, paper jams and litter may be reduced by not presenting the document to the customer if the customer were not present. Furthermore, security/privacy may be improved since the next customer would not be able to obtain any private/confidential information on a document that was never presented to an unavailable customer.

It would therefore be desirable to develop a kiosk comprising a people presence detector that determines whether or not a document, e.g., receipt, ticket, or other kiosk items, e.g., credit card, money, merchandise, are presented to a customer.

SUMMARY

The problems outlined above may at least in part be solved in some embodiments by an infrared device configured to detect the presence of a customer. In one embodiment, a document, e.g., receipt, ticket, detailing information about a transaction between a customer and a kiosk may be printed inside the kiosk. A determination may then be made as to whether the customer is currently present via the infrared device. If the customer is present, then the document may be fed to the customer outside the kiosk. If the customer is not present, then the document may be ejected into an internal receptacle inside the kiosk. By ejecting the document into an internal receptacle instead of presenting the document to an unavailable customer, litter may be reduced. Furthermore, security/privacy may be improved since the next customer would not be able to obtain any private/confidential information on a document that was never presented to an unavailable customer. In another embodiment, a determination may first be made as to whether the customer is present to retrieve the document, e.g., receipt, ticket, detailing information about a transaction between the customer and the kiosk. If the customer is present to retrieve the document, then the document may be printed and directly presented to the customer without first printing the document inside the kiosk. By not printing the document to an unavailable customer, litter may be reduced. Furthermore, wear and tear on the printer may be reduced as well as saving paper by not printing the document to the customer if the customer was not present. Furthermore, security/privacy may be improved since the next customer would not be able to obtain the document that was never presented to an unavailable customer, In another embodiment, a determination may be made as to whether the customer is present to receive a kiosk item, e.g., money, merchandise, credit card. If the customer is present to retrieve the kiosk item, then the kiosk item may be presented to the customer. By not presenting the item to an unavailable customer, security/privacy may be improved since the next customer would not be able to obtain the kiosk item that was never presented to an unavailable customer.

In one embodiment of the present invention, a method for a kiosk to present a document to a customer may comprise the step of conducting a transaction, e.g., buying tickets, getting cash, purchasing gasoline, between a customer and a kiosk. A document, e.g., receipt, ticket, detailing information of the transaction between the customer and the kiosk may be printed inside the kiosk. A determination may then be made as to whether the customer is currently present. The presence of a customer may be detected by an infrared device located internally or externally to the kiosk.

If the customer is not present, then the document may be ejected into an internal receptacle located inside the kiosk. By ejecting the document into the internal receptacle instead of presenting the document to an unavailable customer, litter may be reduced. Furthermore, security/privacy may be improved since the next customer would not be able to obtain any private/confidential information on a document that was never presented to an unavailable customer. Upon ejecting the document into the internal receptacle, the kiosk may conduct another transaction with another customer.

If the customer is present, then the document may be fed to the customer through a printer port. A determination may then be made as to whether the document presented to the customer was taken by the customer within a particular time frame, e.g., thirty seconds. If the document was not taken by the customer within a particular period of time, then the document may be retracted inside the kiosk. Upon retracting the document inside the kiosk, the document may be dispensed into the receptacle inside the kiosk. By retracting and ejecting the document into the internal receptacle instead of leaving the document for the next customer, litter may be reduced. Furthermore, security/privacy may be improved since the next customer may not be able to obtain any private/confidential information on a document that was retracted. Upon ejecting the document into the internal receptacle, the kiosk may conduct another transaction with another customer.

As stated above, a determination may be made as to whether the document presented to the customer was taken by the customer within a particular time frame, e.g., thirty seconds. If the customer had taken the document within the particular period of time, e.g., thirty seconds, then the kiosk may conduct another transaction with another customer.

In another embodiment of the present invention, a method for a kiosk to present a document to a customer may comprise the step of conducting a transaction, e.g., buying tickets, getting cash, purchasing gasoline, between a customer and a kiosk. A determination may then be made as to whether the customer is currently present. The presence of a customer may be detected by an infrared device located internally or externally to the kiosk.

If the customer is not present, then the document, e.g., receipt, ticket, detailing information of the transaction between the customer and the kiosk may not be printed. By not printing the document to an unavailable customer, litter may be reduced. Furthermore, security/privacy may be improved since the next customer would not be able to obtain any private/confidential information on a document that was never presented to an unavailable customer. Upon not printing the document to the unavailable customer, the kiosk may conduct another transaction with another customer.

If the customer is present, then the document, e.g., receipt, ticket, detailing information of the transaction between the customer and the kiosk may be printed and presented to the customer outside the kiosk. A determination may be made as to whether the document presented to the customer was taken by the customer within a particular time frame, e.g., thirty seconds. If the document was not taken by the customer within a particular period of time, then the document may be retracted inside the kiosk. Upon retracting the document inside the kiosk, the document may be dispensed into a receptacle located inside the kiosk. By retracting and ejecting the document into the internal receptacle instead of leaving the document for the next customer, litter may be reduced. Furthermore, security/privacy may be improved since the next customer may not be able to obtain any private/confidential information on a document that was retracted. Upon ejecting the document into the internal receptacle, the kiosk may conduct another transaction with another customer.

As stated above, a determination may be made as to whether the document presented to the customer was taken by the customer within a particular time frame, e.g., thirty seconds. If the customer had taken the document within the particular period of time, e.g., thirty seconds, then the kiosk may conduct another transaction with another customer.

In another embodiment of the present invention, a method for presenting a kiosk item, e.g., money, credit card, merchandise, to the customer if the customer is present may comprise the step of conducting a transaction, e.g., buying tickets, getting cash, purchasing gasoline, between a customer and a kiosk. A determination may then be made as to whether the customer is currently present. The presence of a customer may be detected by an infrared device located internally or externally to the kiosk.

If the customer is not present, then the kiosk item, e.g., money, merchandise, credit card, may not be presented to the customer. By not presenting the item, e.g., money, merchandise, credit card, to an unavailable customer, security/privacy may be improved since the next customer would not be able to obtain the kiosk item, e.g., money, merchandise, credit card, that was never presented to an unavailable customer. Upon not presenting the kiosk item to the customer, the kiosk may conduct another transaction with another customer.

If the customer is present, then the kiosk item, e.g., money, credit card, merchandise, may be presented to the customer. A determination may then be made as to whether the kiosk item, e.g., credit card, merchandise, money, presented to the customer was taken by the customer within a particular time frame, e.g., thirty seconds. If the kiosk item was not taken by the customer within a particular period of time, then the kiosk item may be retracted inside the kiosk. Upon retracting the kiosk item inside the kiosk, the item may be dispensed into an internal receptacle to store the retracted item. By retracting and ejecting the kiosk item, e.g., money, merchandise, credit card, into an internal receptacle instead of leaving the kiosk item for the next customer, security/privacy may be improved since the next customer may not be able to obtain the item that was retracted. Upon ejecting the kiosk item into the internal receptacle, the kiosk may conduct another transaction with another customer.

As stated above, a determination may be made as to whether the kiosk item, e.g., money, merchandise, credit card, presented to the customer was taken by the customer within a particular time frame, e.g., thirty seconds. If the customer had taken the kiosk item, e.g., money, merchandise, credit card, within the particular period of time, e.g., thirty seconds, then the kiosk may conduct another transaction with another customer.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
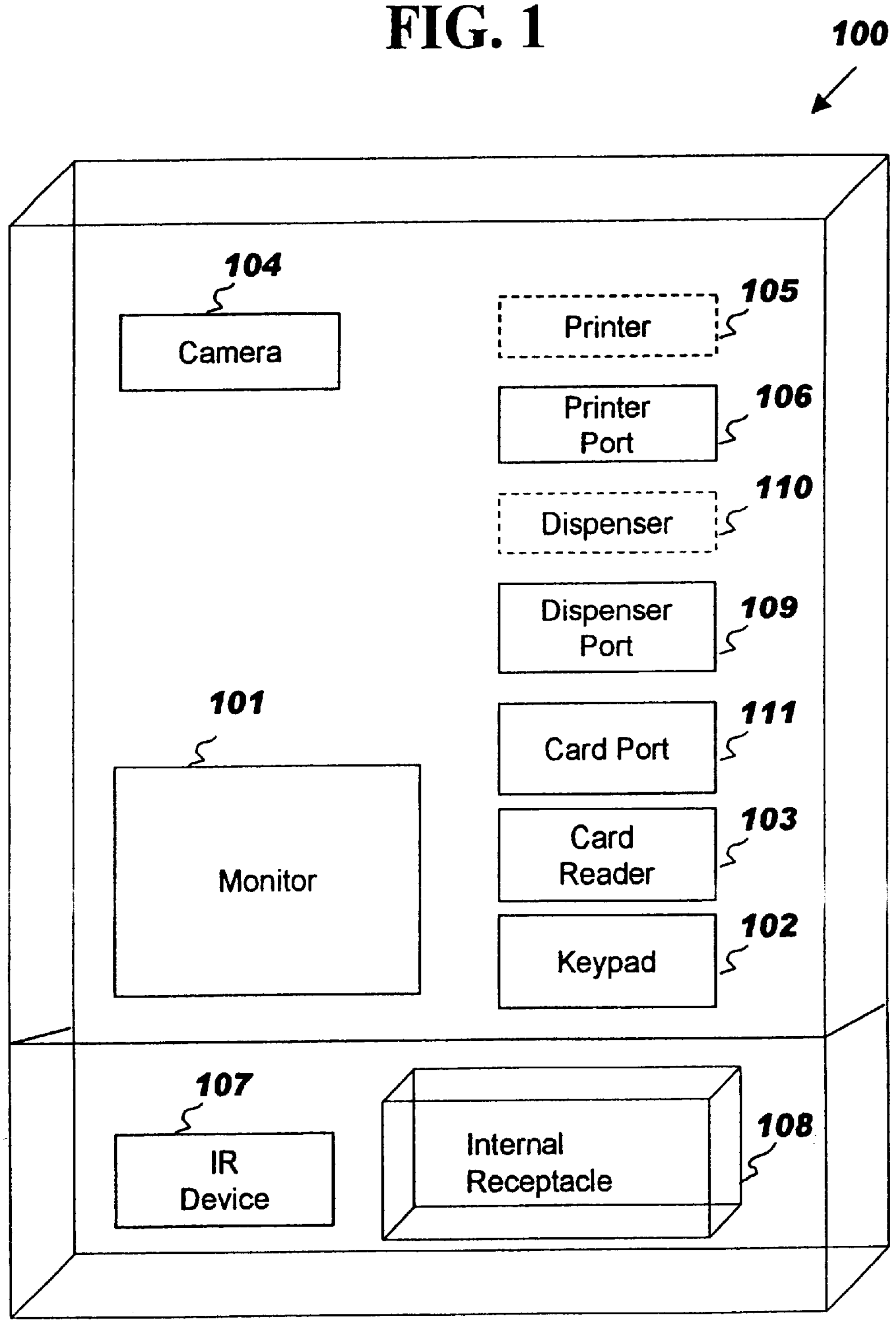
FIG. 1 is a perspective view of the front of a kiosk according to an embodiment of the present invention.

FIG. 1—Perspective View of the Front of a Kiosk

FIG. 1 illustrates a perspective view of the front of a kiosk 100, e.g., ATMs, gasoline pumps, parking meters, airline ticket machines, according to an embodiment of the present invention. Kiosk 100 may comprise a monitor 101 configured to display questions, information, e.g., bank account information, to a customer of kiosk 100. Kiosk 100 may further comprise a dispenser 110, e.g., cash dispenser, merchandise dispenser, configured to dispense an item, e.g., cash, merchandise, via a dispense port 109 to the customer. In one embodiment, dispenser 110, e.g., cash dispenser, merchandise dispenser, may be configured to dispense an item, e.g. cash, merchandise, via a dispense port 109 to the customer only if the customer is present thereby providing a means of security/privacy as discussed in greater detail in conjunction with FIG. 5. It is noted that there are other means for kiosk 100 to communicate with the customer and that such means would be recognized by an artisan of ordinary skill in the art. It is further noted that embodiments employing such means would fall within the scope of the present invention. It is further noted that dispenser 110, e.g., cash dispenser, merchandise dispenser, may be configured to retract the dispensed item, e.g., cash, merchandise, if the customer did not take the item within a particular period of time, e.g., thirty seconds, as described in additional detail in conjunction with FIG. 5. Upon retracting the dispensed item, the item may be ejected into an internal receptacle 108 located within kiosk 100 by dispenser 110. By retracting and ejecting the dispensed item, e.g., money, merchandise, into internal receptacle 108 instead of leaving the item for the next customer, security/privacy may be improved since the next customer may not be able to obtain the item, e.g., money, merchandise, that was retracted.

Monitor 101 may further be configured to have touch screen capability thereby allowing the customer to communicate with kiosk 100 by the customer touching monitor 101 at the location indicated. For example, images of a “yes” and a “no” button may appear and by touching the “yes” button, the customer may indicate an affirmative response to a question presented. Kiosk 100 may further comprise a keypad 102 configured to allow the customer to enter alphanumeric information, e.g., account number, credit card number, in order for the customer to conduct a transaction with kiosk 100. Kiosk may further comprise a card reader 103 configured to read a card, e.g., ATM card, credit card, in order for the customer to conduct a transaction with kiosk 100. Card Reader 103 may further be configured to dispense the read card, e.g., ATM card, credit card, to the customer via a card port 111. In one embodiment, card reader 103 may be configured to dispense the read card, e.g., ATM card, credit card, to the customer via card port 111 only if the customer is present thereby providing a means of security/privacy as discussed in greater detail in conjunction with FIG. 5. It is noted that there are other means for the customer to communicate with kiosk 100 and that such means would be recognized by an artisan of ordinary skill in the art. It is further noted that embodiments employing such means would fall within the scope of the present invention. It is further noted that card reader 103 may be configured to retract a card, e.g., ATM card, credit card, if the customer did not take the card within a particular period of time, e.g., thirty seconds, as described in additional detail in conjunction with FIG. 5. Upon retracting the card, the card may be ejected into internal receptacle 108 located within kiosk 100 by card reader 103. By retracting and ejecting the card, e.g., ATM card, credit card, into an internal receptacle 108 instead of leaving the card for the next customer, security/privacy may be improved since the next customer may not be able to obtain the card that was retracted.

Kiosk 100 may further comprise a camera 104 configured to take a photograph of the customer in order to identify the customer associated with the current transaction. If the customer is an unauthorized customer, the photograph of the customer may provide a means for capturing the unauthorized customer. It is noted that there are other means for providing security and that such means would be recognized by an artisan of ordinary skill in the art. It is further noted that embodiments employing such means would fall within the scope of the present invention.

Kiosk 100 may further comprise an internal printer 105 configured to print a document, e.g., receipt, detailing information of the transaction where the document may be directly presented to the customer through a printer port 106. Internal printer 105 may be configured to print the document, e.g., receipt, where the document is directly presented to the customer through printer port 106 if the customer is present. The presence of the customer may be detected via an infrared device 107. Infrared device 107 may be located anywhere, both internally and externally, in kiosk 100. It is further noted that there are other means for detecting the presence of the customer and that such means would be recognized by an artisan of ordinary skill in the art. It is further noted that embodiments employing such means would fall within the scope of the present invention.

As stated above, internal printer 105 may print the document, e.g., receipt, detailing information of the transaction where the document is directly presented to the customer through printer port 106 if the customer is present as indicated by infrared device 107. A determination may be made as to whether the document was taken by the customer within a particular period of time, e.g., thirty seconds. If the document was not taken by the customer within the particular period of time, then the document may be retracted and dispensed into internal receptacle 108 located within kiosk 100 by internal printer 105. By retracting and ejecting the document into an internal receptacle 108 instead of leaving the document for the next customer, litter may be reduced. Furthermore, security/privacy may be improved since the next customer may not be able to obtain any private/confidential information on a document that was retracted.

Internal printer 105 may further be configured to print the document, e.g., receipt, ticket, detailing information of the transaction inside kiosk 100. Upon printing the document inside kiosk 100, a determination may be made as to whether the customer is present. If the customer is present as indicated by infrared device 107, then the document may be fed to the customer through printer port 106. If the customer is not present, then the document may be ejected into internal receptacle 108 located inside kiosk 100 by internal printer 105. By ejecting the document into an internal receptacle 108 instead of presenting the document to an unavailable customer, litter may be reduced. Furthermore, security/privacy may be improved since the next customer would not be able to obtain any private/confidential information on a document that was never presented to an unavailable customer. It is noted that a person of ordinary skill in the art may be able to design an apparatus that may selectively transfer a document to separate paths.

As stated above, if the customer is present as indicated by infrared device 107, then the document may be fed to the customer through printer port 106. A determination may be made as to whether the document was taken by the customer within a particular period of time, e.g., thirty seconds. If the document was not taken by the customer within the particular period of time, then the document may be retracted and dispensed into internal receptacle 108 by internal printer 105.

As stated above, FIG. 1 illustrated a perspective view of the front of kiosk 100, e.g., ATMs, gasoline pumps, parking meters, airline ticket machines, according to an embodiment of the present invention. A description of a block diagram of kiosk 100 is provided below.

Figure 2:
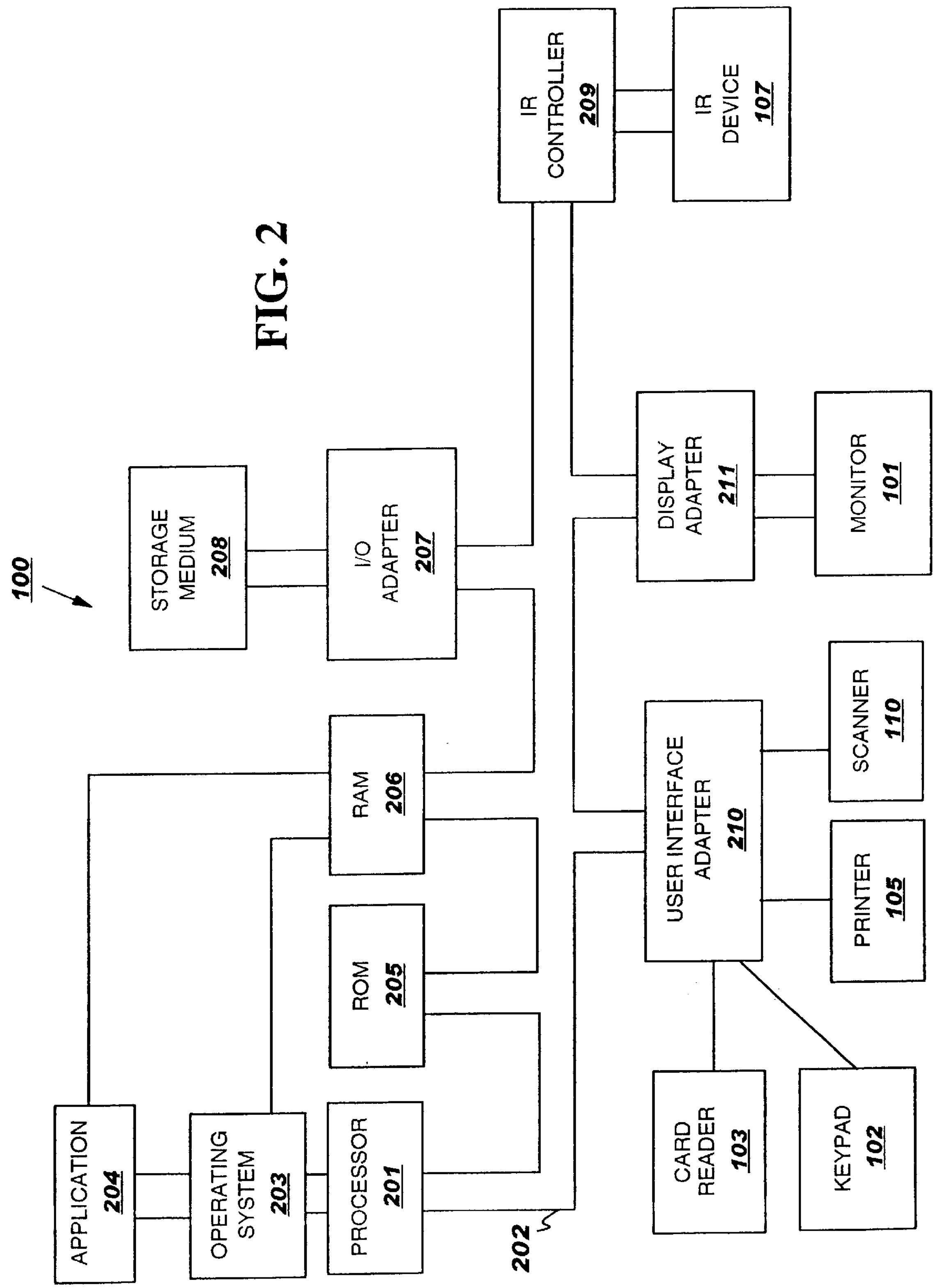
FIG. 2 illustrates a block diagram of the circuit components of a kiosk configured in accordance with the present invention.

FIG. 2—Block Diagram of the Circuit Components of a Kiosk

FIG. 2 illustrates a block diagram of the circuit components of kiosk 100, e.g., ATMs, gasoline pumps, parking meters, airline ticket machines, configured in accordance with the present invention. Referring to FIG. 2, kiosk 100 may comprise a processor 201 coupled to various other components by a bus 202. An operating system 203 may run on processor 201 and provide control as well as coordinate the function of the various components of FIG. 2. An application 204 in accordance with the principles of the present invention may run in conjunction with operating system 203 and may provide output calls to operating system 203 where the output calls implement the various functions or services to be performed by application 204. Application 204 may include for example, a program for presenting a document to a customer of a kiosk if the customer is present where the document is first printed inside the kiosk as described in FIG. 3, a program for presenting a document directly to a customer of a kiosk if the customer is present where the document is directly presented to the customer without first printing the document inside the kiosk as described in FIG. 4, a program for presenting a kiosk item, e.g., credit card, money, merchandise, to the customer if the customer is present as described in FIG. 5. Read only memory (ROM) 205 may be coupled to bus 202 and include a Basic Input/Output System ("BIOS") that controls certain basic functions of kiosk 100. Random access memory (RAM) 206 and Input/Output (I/O) adapter 207 may also be coupled to bus 202. It should be noted that software components including operating system 203 and application 204 may be loaded into RAM 206 which may be the kiosk's 100 main memory. I/O adapter 207 may be an integrated drive electronics ("IDE") adapter that communicates with storage medium 208, e.g., disk drive. It is noted that the program of the present invention that presents a document to a customer of a kiosk if the customer is present where the document is first printed inside the kiosk, as described in FIG. 3, may reside in storage medium 208 or in application 204. It is further noted that the program of the present invention that presents a document to a customer of a kiosk if the customer is present where the document is directly presented to the customer without first printing the document inside the kiosk, as described in FIG. 4, may reside in storage medium 208 or in application 204. It is further noted that the program of the present invention that presents a kiosk item, e.g., cash, merchandise, credit card, to the customer if the customer is present, as described in FIG. 5, may reside in storage medium 208 or in application 204.

Kiosk 100 may further comprise an Infrared (IR) controller 209 coupled to bus 202. IR controller 209 may be a dedicated controller configured for processing an infrared code transmitted by IR device 107 (FIG. 1) indicating whether a customer of kiosk 100 is present or not.

Input/Output devices may also be connected to bus 202 via a user interface adapter 210 and display adapter 211. Card reader 103 (FIG. 1), keypad 102 (FIG. 1) and dispenser 110 (FIG. 1) may be connected to bus 202 through user interface adapter 211. As stated above, card reader 103 may be configured to read a card, e.g., ATM card, credit card, in order for the customer to conduct a transaction with kiosk 100. Keypad 102 may be configured to allow the customer to enter alphanumeric information, e.g., account number, credit card number, in order for the customer to conduct a transaction with kiosk 100. Dispenser 110, e.g., cash dispenser, merchandise dispenser, may be configured to dispense an item, e.g., cash, merchandise, via port 109 (FIG. 1) to the customer. Furthermore, an internal printer 105 may be connected to bus 202 through user interface adapter 210. As stated above, printer 105 may be configured to print a document, e.g., receipt, ticket, detailing information of the transaction inside kiosk 100 that may later be presented to the customer if the customer is present as described in additional detail in conjunction with FIG. 3. Printer 105 may further be configured to print a document, e.g., receipt, ticket, detailing information of the transaction that may be directly presented to the customer if the customer is present without first printing the document inside kiosk 100 as described in additional detail in conjunction with FIG. 4. Printer 105 may further be configured to retract and eject the document that was presented to the customer into internal receptacle 108 (FIG. 1) if the customer did not take the document within a particular period of time as described in additional detail in conjunction with FIGS. 3 and 4. Furthermore, monitor 101 (FIG. 1) may be connected to bus 202 by display adapter 211. In this manner, a user may be capable of inputting to kiosk 100 through monitor 101, keypad 102 and card reader 103 and receiving output from kiosk 100 via monitor 101, dispenser 110 and printer 105. It is noted that there are numerous types of input devices, printers and display devices known to those skilled in the art and thus need not be described in detail herein. It is further noted that those of ordinary skill in the art will appreciate that the components in FIG. 2 may vary depending on the implementation and that FIG. 2 is illustrative.

Implementations of the invention include implementations as a kiosk programmed to execute the method or methods described herein, and as a program product. According to the kiosk implementation, sets of instructions for executing the method or methods may be resident in the random access memory 206 of one or more kiosks configured generally as described above. Until required by kiosk 100, the set of instructions may be stored as a program product in another kiosk memory, for example, in storage medium 208. Further, the program product may also be stored at another kiosk or at a computer and transmitted when desired to kiosk 100 by a network or by an external network such as the Internet. One skilled in the art would appreciate that the physical storage of the sets of instructions physically changes the medium upon which it is stored so that the medium carries computer readable information. The change may be electrical, magnetic, chemical, biological or some other physical change.

Figure 3:
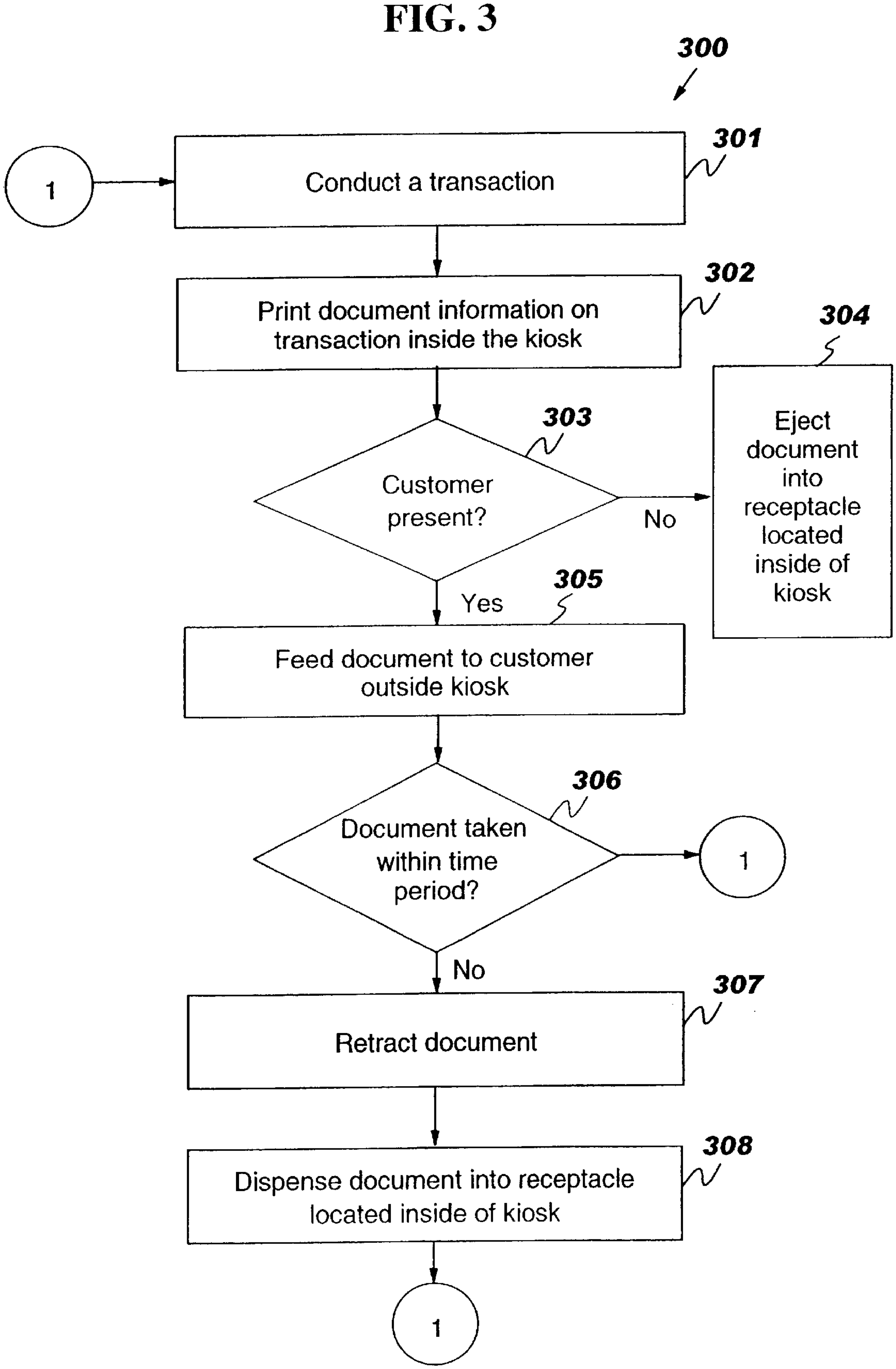
FIG. 3 is a flowchart of method for a kiosk to present a document to a customer in accordance with the present invention.

FIG. 3—Flowchart of a Method for Printing a Document Inside the Kiosk that may Later be Presented to the Customer Outside the Kiosk if the Customer is Present FIG. 3 is a flowchart of one embodiment of the present invention of a method 300 for printing a document inside kiosk 100 that may later be presented to the customer outside kiosk 100 if the customer is present. As stated in the Background Information section, some kiosks have been designed with a printer configured to pull an abandoned document back into the kiosk if it is not removed within a certain time period. The retracted document may then be fed into a receptacle located inside the kiosk to eliminate litter surrounding the area around the kiosk. However, the kiosk may be exposed to paper jams and unreliable operation because the document may become damaged while outside the kiosk. Furthermore, since the determination of retracting a document is based upon an elapsed time period, a customer may be unable to retrieve the document because the customer did not take the document quickly enough. If the presentment of the document were based upon the presence of the customer, then the document may only be presented to the customer if the customer were available to take the document. Consequently, litter may be reduced by not presenting the document to the customer if the customer were not present. Furthermore, security/privacy may be improved since the next customer would not be able to obtain any private/confidential information on a document that was never presented to an unavailable customer. It would therefore be desirable to develop a kiosk comprising a people presence detector that determines whether or not a document, e.g., receipt, is presented to a customer. Method 300 is a method for printing a document inside kiosk 100 that may later be presented to the customer if the customer is present.

In step 301, a transaction, e.g., buying tickets, getting cash, purchasing gasoline, may be conducted by the customer with kiosk 100 (FIGS. 1 and 2). In step 302, a document, e.g., receipt, detailing information of the transaction between the customer and kiosk 100 may be printed inside kiosk 100 by printer 105 (FIGS. 1 and 2).

A determination may then be made in step 303 as to whether the customer is currently present. As stated above, the presence of a customer may be detected by infrared device 107 (FIGS. 1 and 2). If the customer is not present, then the document may be ejected into internal receptacle 108 (FIG. 1) located inside kiosk 100 in step 304. By ejecting the document into internal receptacle 108 instead of presenting the document to an unavailable customer, litter may be reduced. Furthermore, security/privacy may be improved since the next customer would not be able to obtain any private/confidential information on a document that was never presented to an unavailable customer. Upon ejecting the document into internal receptacle 108, kiosk 100 may conduct another transaction with another customer in step 301.

Returning to step 303, if the customer is present, then the document may be fed to the customer through printer port 106 (FIG. 1) in step 305. In step 306, a determination may be made as to whether the document presented to the customer was taken by the customer within a particular time frame, e.g., thirty seconds. If the document was not taken by the customer within a particular period of time, then the document may be retracted inside the kiosk in step 307 by printer 105. Upon retracting the document inside kiosk 100, the document may be dispensed into receptacle 108 inside kiosk 100 by printer 105 in step 308. By retracting and ejecting the document into an internal receptacle 108 instead of leaving the document for the next customer, litter may be reduced. Furthermore, security/privacy may be improved since the next customer may not be able to obtain any private/confidential information on a document that was retracted. Upon ejecting the document into internal receptacle 108, kiosk 100 may conduct another transaction with another customer in step 301.

Returning to step 306, if the customer had taken the document within the particular period of time, e.g., thirty seconds, then kiosk 100 may conduct another transaction with another customer in step 301.

It is noted that method 300 may be executed in a different order presented and that the order presented in the discussion of FIG. 3 is illustrative. It is further noted that certain steps in method 300 may be executed in a substantially simultaneous manner.

Figure 4:
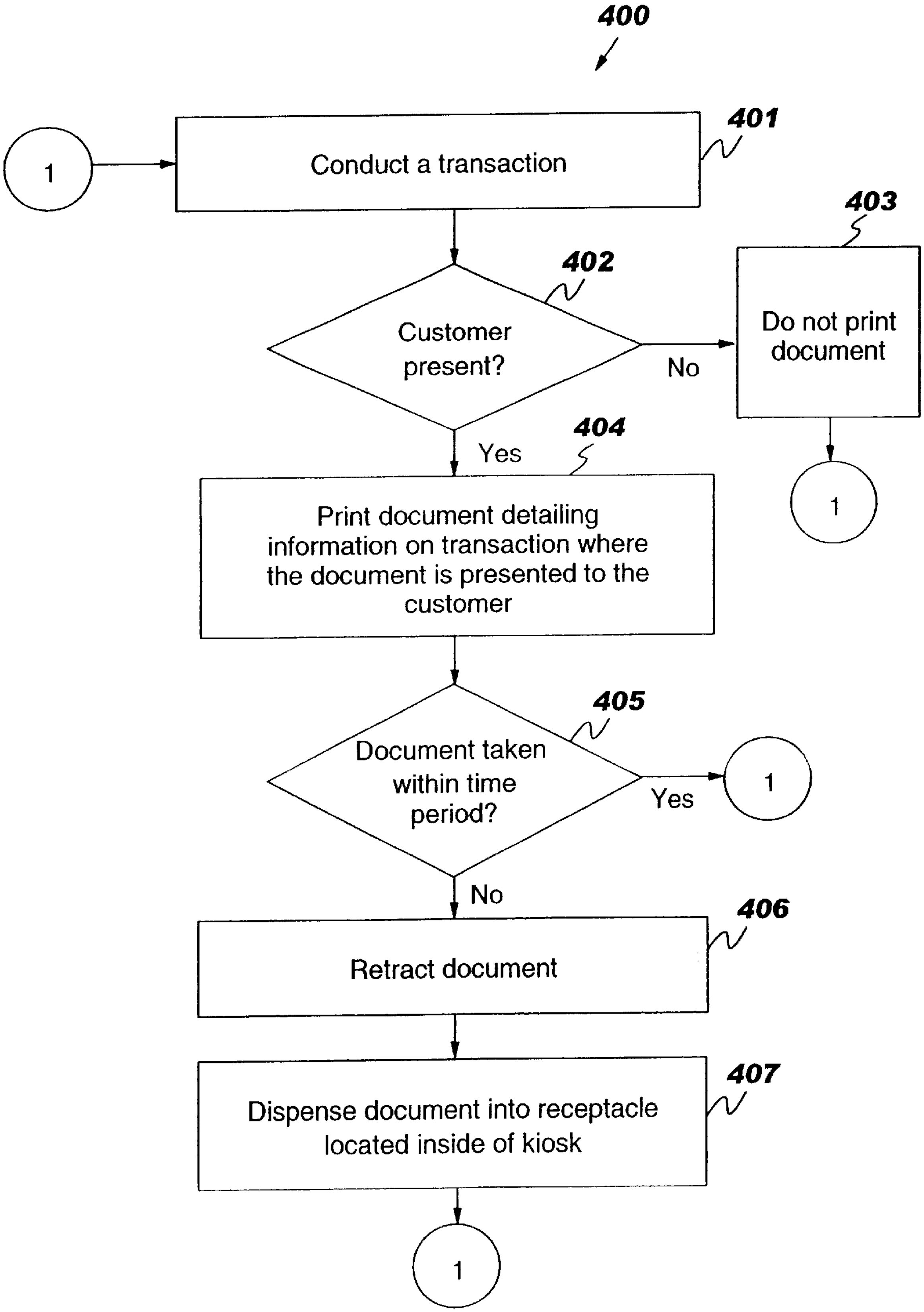
FIG. 4 is a flowchart of another method for a kiosk to present a document to a customer in accordance with the present invention.

FIG. 4—Flowchart of a Method for Printing a Document to be Directly Presented to the Customer if the Customer is Present Without First Printing the Document Inside the Kiosk FIG. 4 is a flowchart of one embodiment of the present invention of a method 400 for printing a document to be directly presented to the customer if the customer is present without first printing the document inside the kiosk.

In step 401, a transaction, e.g., buying tickets, getting cash, purchasing gasoline, may be conducted by the customer with kiosk 100 (FIGS. 1 and 2).

A determination may then be made in step 402 as to whether the customer is currently present. As stated above, the presence of a customer may be detected by infrared device 107 (FIGS. 1 and 2). If the customer is not present, then the document, e.g., receipt, ticket, detailing information of the transaction between the customer and kiosk 100 (FIGS. 1 and 2) may not be printed in step 403. By not printing the document to an unavailable customer, litter may be reduced. Furthermore, security/privacy may be improved since the next customer would not be able to obtain any private/confidential information on a document that was never presented to an unavailable customer. Upon not printing the document to the unavailable customer, kiosk 100 may conduct another transaction with another customer in step 401.

Returning to step 402, if the customer is present, then the document, e.g., receipt, detailing information of the transaction between the customer and kiosk 100 may be printed and presented to the customer outside kiosk 100 via printer port 106 (FIG. 1) by printer 105 (FIGS. 1 and 2) in step 404.

In step 405, a determination may be made as to whether the document presented to the customer was taken by the customer within a particular time frame, e.g., thirty seconds. If the document was not taken by the customer within a particular period of time, then the document may be retracted inside kiosk in step 406 by printer 105. Upon retracting the document inside kiosk 100, the document may be dispensed into receptacle 108 (FIG. 1) inside kiosk 100 by printer 105 in step 407. By retracting and ejecting the document into an internal receptacle 108 instead of leaving the document for the next customer, litter may be reduced. Furthermore, security/privacy may be improved since the next customer may not be able to obtain any private/confidential information on a document that was retracted. Upon ejecting the document into internal receptacle 108, kiosk 100 may conduct another transaction with another customer in step 401.

Returning to step 405, if the customer had taken the document within the particular period of time, e.g., thirty seconds, then kiosk 100 may conduct another transaction with another customer in step 401.

It is noted that method 400 may be executed in a different order presented and that the order presented in the discussion of FIG. 4 is illustrative. It is further noted that certain steps in method 400 may be executed in a substantially simultaneous manner.

Figure 5:
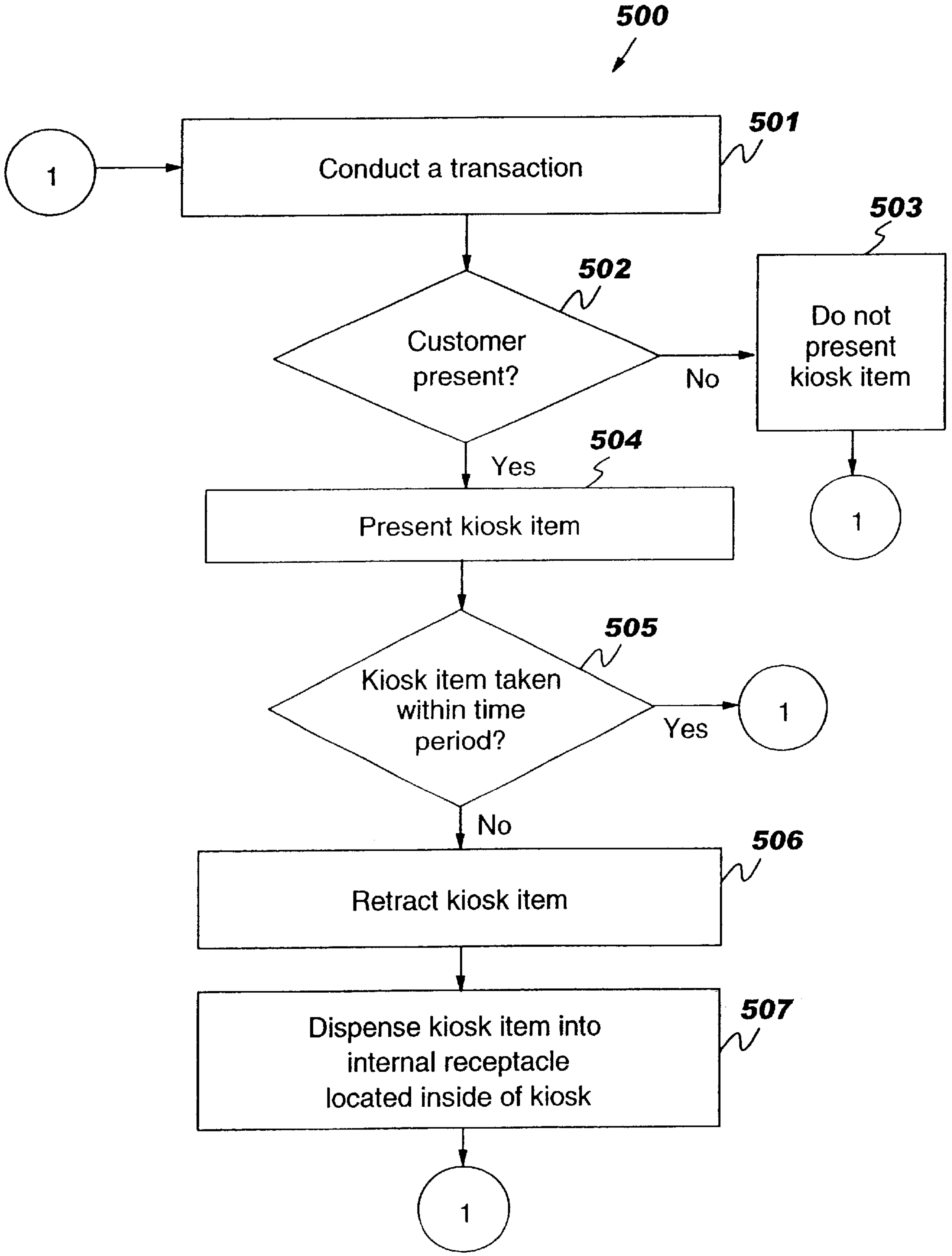
FIG. 5 is a flowchart of a method for a kiosk to present a kiosk item to a customer in accordance with the present invention.

FIG. 5—Flowchart of a Method for Presenting a Kiosk Item to the Customer if the Customer is Present FIG. 5 is a flowchart of one embodiment of the present invention of a method 500 for presenting a kiosk item, e.g., money, credit card, merchandise, to the customer if the customer is present.

In step 501, a transaction, e.g., buying tickets, getting cash, purchasing gasoline, may be conducted by the customer with kiosk 100 (FIGS. 1 and 2).

A determination may then be made in step 502 as to whether the customer is currently present. As stated above, the presence of a customer may be detected by infrared device 107 (FIGS. 1 and 2). If the customer is not present, then the kiosk item, e.g., money, merchandise, credit card, may not be presented to the customer in step 503. By not presenting the item, e.g., money, merchandise, credit card, to an unavailable customer, security/privacy may be improved since the next customer would not be able to obtain the kiosk item, e.g., money, merchandise, credit card, that was never presented to an unavailable customer. Upon not presenting the kiosk item to the unavailable customer, kiosk 100 may conduct another transaction with another customer in step 501.

Returning to step 502, if the customer is present, then the kiosk item, e.g., money, credit card, merchandise, may be presented to the customer in step 504. For example, dispenser 110 (FIGS. 1 and 2), e.g., cash dispenser, merchandise dispenser, may dispense an item, e.g., cash, merchandise, via dispense port 109 (FIG. 1) to the customer if the customer is present. Card reader 103 (FIG. 1) may be configured to dispense the card read, e.g., ATM card, credit card, to the customer via card port 111 (FIG. 1) if the customer is present.

In step 505, a determination may be made as to whether the kiosk item, e.g., credit card, merchandise, money, presented to the customer was taken by the customer within a particular time frame, e.g., thirty seconds. If the kiosk item was not taken by the customer within a particular period of time, then the kiosk item may be retracted inside kiosk in step 506. For example, dispenser 110, e.g., cash dispenser, merchandise dispenser, may retract a dispensed item, e.g., cash, merchandise, if the customer had not taken the dispensed item within a particular period of time. Card reader 103 (FIG. 1) may retract a dispensed card, e.g., ATM card, credit card, if the customer had not taken the dispensed card within a particular period of time.

Upon retracting the kiosk item inside kiosk 100, the item may be dispensed into receptacle 108 (FIG. 1) to store the retracted item. By retracting and ejecting the kiosk item, e.g., money, merchandise, credit card, into internal receptacle 108 instead of leaving the kiosk item for the next customer, security/privacy may be improved since the next customer may not be able to obtain the item that was retracted. Upon ejecting the kiosk item into an internal receptacle 108, kiosk 100 may conduct another transaction with another customer in step 501.

Returning to step 505, if the customer had taken the kiosk item, e.g., money, merchandise, credit card, within the particular period of time, e.g., thirty seconds, then kiosk 100 may conduct another transaction with another customer in step 501.

It is noted that method 500 may be executed in a different order presented and that the order presented in the discussion of FIG. 5 is illustrative. It is further noted that certain steps in method 500 may be executed in a substantially simultaneous manner.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for a kiosk to present a document to a customer comprising the steps of:

conducting a transaction with said customer;

printing said document detailing information of said transaction inside said kiosk; and determining if said customer is present upon said step of printing said document detailing information of said transaction inside said kiosk, and ejecting said document into a receptacle located inside said kiosk if said customer is not present.

2. The method as recited in claim 1 further comprising the step of:

feeding said document outside said kiosk if said customer is present.

3. The method as recited in claim 2 further comprising the step of:

determining whether said document was taken by said customer within a predetermined period of time.

4. The method as recited in claim 3, wherein if said document was not taken by said customer within said predetermined period of time, then the method further comprises the steps of:

retracting said document into said kiosk; and dispensing said document into a receptacle located inside said kiosk.

5. The method as recited in claim 1, wherein said step of determining if said customer is present further comprises receiving a signal from an infrared device.

6. A kiosk, comprising:

a memory unit operable for storing a program operable for presenting a document to a customer; and a processor coupled to said memory unit, wherein said processor, responsive to said program, comprises:

circuitry operable for conducting a transaction with said customer;

circuitry operable for printing said document detailing information of said transaction inside said kiosk; and circuitry operable for determining if said customer is present upon printing said document detailing information of said transaction inside said kiosk, and circuitry operable for ejecting said document into a receptacle located inside said kiosk if said customer is not present.

7. The system as recited in claim 6, wherein said processor further comprises:

circuitry operable for feeding said document outside said kiosk if said customer is present.

8. The system as recited in claim 7, wherein said processor further comprises:

circuitry operable for determining whether said document was taken by said customer within a predetermined period of time.

9. The system as recited in claim 8, wherein if said document was not taken by said customer within said predetermined period of time, then said processor further comprises:

circuitry operable for retracting said document into said kiosk; and circuitry operable for dispensing said document into a receptacle located inside said kiosk.

10. The system as recited in claim 6 further comprises:

an infrared device coupled to said processor, wherein said infrared device is configured to detect a presence of said customer, wherein said circuitry operable for determining if said customer is present is operable for receiving a signal from said infrared device.

11. A kiosk, comprising:

means for conducting a transaction with a customer;

means for printing a document detailing information of said transaction inside said kiosk; and means for determining if said customer is present upon printing said document detailing information of said transaction inside said kiosk, and means for ejecting said document into a receptacle located inside said kiosk if said customer is not present.

12. The system as recited in claim 11 further comprises:

means for feeding said document outside said kiosk if said customer is present.

13. The system as recited in claim 12 further comprises:

means for determining whether said document was taken by said customer within a predetermined period of time.

14. The system as recited in claim 13, wherein if said document was not taken by said customer within said predetermined period of time, then said system further comprises:

means for retracting said document into said kiosk; and means for dispensing said document into a receptacle located inside said kiosk.

15. A method for a kiosk to present a document to a customer comprising the steps of:

conducting a transaction with said customer;

determining if said customer is present; and determining whether to print said document in response to said determination if said customer is present, and determining that if said customer is not present, said document may be ejected into a receptacle located inside said kiosk.

16. The method as recited in claim 15, wherein if said customer is present, then said document is printed.

17. The method as recited in claim 16, wherein said document is presented to said customer.

18. The method as recited in claim 17 further comprising the step of:

determining whether said document was taken by said customer within a predetermined period of time.

19. The method as recited in claim 18, wherein if said document was not taken by said customer within said predetermined period of time, then the method further comprises the steps of:

retracting said document into said kiosk; and dispensing said document into a receptacle located inside said kiosk.

20. The method as recited in claim 15, wherein said step of determining if said customer is present further comprises receiving a signal from an infrared device.

21. A system, comprising:

a memory unit operable for storing a program operable for presenting a document to a customer; and a processor coupled to said memory unit, wherein said processor, responsive to said program, comprises:

circuitry operable for conducting a transaction with said customer;

circuitry operable for determining if said customer is present; and circuitry operable for determining whether to print said document in response to said determination if said customer is present; and circuitry operable for ejecting said document into a receptacle located inside said kiosk if said customer is not present.

22. The system as recited in claim 21, wherein if said customer is present, then said processor further comprises:

circuitry operable for printing said document.

23. The system as recited in claim 22, wherein said document is presented to said customer.

24. The system as recited in claim 23, wherein said processor further comprises:

circuitry operable for determining whether said document was taken by said customer within a predetermined period of time.

25. The system as recited in claim 24, wherein if said document was not taken by said customer within said predetermined period of time, then said processor further comprises:

circuitry operable for retracting said document into said kiosk; and circuitry operable for dispensing said document into a receptacle located inside said kiosk.

26. The system as recited in claim 21, wherein said system further comprises:

an infrared device coupled to said processor, wherein said infrared device is configured to detect a presence of said customer, wherein said circuitry operable for determining if said customer is present is operable for receiving a signal from said infrared device.

27. A system, comprising:

means for conducting a transaction with said customer;

means for determining if said customer is present; and means for determining whether to print said document in response to said determination if said customer is present, and means for ejecting said document into a receptacle located inside said kiosk if said customer is not present.

28. The system as recited in claim 27, wherein if said customer is present, then said document is printed.

29. The system as recited in claim 28, wherein said document is presented to said customer.

30. The system as recited in claim 29, wherein said system further comprises:

means for determining whether said document was taken by said customer within a predetermined period of time.

31. The system as recited in claim 30, wherein if said document was not taken by said customer within said predetermined period of time, then said system further comprises:

means for retracting said document into said kiosk; and means for dispensing said document into a receptacle located inside said kiosk.

32. A method for a kiosk to present a kiosk item to a customer comprising the steps of:

conducting a transaction with said customer;

determining if said customer is present; and determining whether to present said kiosk item in response to said determination if said customer is present, and determining that if said customer is not present, said document may be ejected into a receptacle located inside said kiosk.

33. The method as recited in claim 32, wherein if said customer is present, then said kiosk item is presented to said customer.

34. The method as recited in claim 33, further comprising the step of:

determining whether said kiosk item was taken by said customer within a predetermined period of time.

35. The method as recited in claim 34, wherein if said kiosk item was not taken by said customer within said predetermined period of time, then the method further comprises the steps of:

retracting said kiosk item into said kiosk; and dispensing said kiosk item into a receptacle located inside said kiosk.

36. The method as recited in claim 32, wherein said step of determining if said customer is present further comprises receiving a signal from an infrared device.

37. The method as recited in claim 32, wherein said kiosk item comprises a credit card.

38. The method as recited in claim 32, wherein said kiosk item comprises merchandise.

39. The method as recited in claim 32, wherein said kiosk item comprises money.

40. A system, comprising:

a memory unit operable for storing a program operable for presenting a kiosk item to a customer; and a processor coupled to said memory unit, wherein said processor, responsive to said program, comprises:

circuitry operable for conducting a transaction with said customer;

circuitry operable for determining if said customer is present; and circuitry operable for determining whether to present said kiosk item in response to said determination if said customer is present, and circuitry operable for ejecting said document into a receptacle located inside said kiosk if said customer is not present.

41. The system as recited in claim 40, wherein if said customer is present, then said processor further comprises:

circuitry operable for presenting said kiosk item to said customer.

42. The system as recited in claim 41, wherein said processor further comprises:

circuitry operable for determining whether said kiosk item was taken by said customer within a predetermined period of time.

43. The system as recited in claim 41, wherein if said kiosk item was not taken by said customer within said predetermined period of time, then said processor further comprises:

circuitry operable for retracting said kiosk item into said kiosk; and circuitry operable for dispensing said kiosk item into a receptacle located inside said kiosk.

44. The system as recited in claim 40, wherein said system further comprises:

an infrared device coupled to said processor, wherein said infrared device is configured to detect a presence of said customer, wherein said circuitry operable for determining if said customer is operable for receiving a signal from said infrared device.

45. The system as recited in claim 40, wherein said kiosk item comprises a credit card.

46. The system as recited in claim 40, wherein said kiosk item comprises merchandise.

47. The system as recited in claim 40, wherein said kiosk item comprises money.

* * * * *